(12) United States Patent
Wissink et al.

(10) Patent No.: US 11,768,128 B2
(45) Date of Patent: Sep. 26, 2023

(54) NEUTRONIC ENGINE

(71) Applicant: UT-Battelle, LLC, Oak Ridge, TN (US)

(72) Inventors: Martin L. Wissink, Oak Ridge, TN (US); Christopher L. Wray, San Antonio, TX (US); Scott J. Curran, Oak Ridge, TN (US); Ke An, Oak Ridge, TN (US); Matthew J. Frost, Oak Ridge, TN (US); Yan Chen, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/833,989

(22) Filed: Jun. 7, 2022

(65) Prior Publication Data
US 2022/0390326 A1 Dec. 8, 2022

Related U.S. Application Data

(60) Provisional application No. 63/208,124, filed on Jun. 8, 2021.

(51) Int. Cl.
*G01M 15/04* (2006.01)
*G01M 15/02* (2006.01)
(Continued)

(52) U.S. Cl.
CPC ............. *G01M 15/042* (2013.01); *F01P 3/02* (2013.01); *F01P 3/08* (2013.01); *F02F 1/36* (2013.01);
(Continued)

(58) Field of Classification Search
CPC ........ G01M 15/042; G01M 15/02; F01P 3/02; F01P 3/08; F01P 2003/021; F01P 3/10; F02F 1/36
See application file for complete search history.

(56) References Cited

U.S. PATENT DOCUMENTS

| 6,116,197 A * | 9/2000 | Tsunoda ................. F02B 75/20 123/41.31 |
| 2012/0227700 A1* | 9/2012 | Gunning .................. F02F 3/00 123/193.6 |

(Continued)

OTHER PUBLICATIONS

Wissink, M.L., et al., Operando measurement of lattice strain in internal combustion engine components by neutron diffraction. Proceedings of the National Academy of Sciences, 2020. 117(52): p. 33061-33071.

(Continued)

*Primary Examiner* — Syed O Hasan
(74) *Attorney, Agent, or Firm* — WARNER NORCROSS + JUDD LLP

(57) ABSTRACT

An internal combustion engine for neutron diffraction analysis is provided. The engine includes an elongated piston chamber formed from an aluminum alloy to ensure maximum neutron visibility into the combustion chamber. An elongated piston assembly reciprocates within the elongated piston chamber, the piston assembly including an upper piston joined to a lower piston. The upper piston and the lower piston are hollow, thereby reducing the reciprocating mass and increasing neutron access to the combustion chamber. The upper piston is lubricated with a neutron-transparent fluorocarbon lubricant such as perfluoropolyether (PFPE), while the lower piston and the crankcase are lubricated with hydrocarbon lubricant. The engine enables 3D and time-resolved measurements of strain, stress, and temperature, as well as phase transformation, texture, and microstructure.

47 Claims, 13 Drawing Sheets

(51) Int. Cl.
  *F01P 3/08* (2006.01)
  *F01P 3/02* (2006.01)
  *F02F 1/36* (2006.01)
(52) U.S. Cl.
  CPC ....... *G01M 15/02* (2013.01); *F01P 2003/021* (2013.01)

(56) References Cited

U.S. PATENT DOCUMENTS

2015/0184563 A1* 7/2015 Yamada ............... F01L 1/146
                                                  123/196 M
2018/0328815 A1* 11/2018 Akiyama ............. G01M 15/02

OTHER PUBLICATIONS

Hellman, P.T., L. Gschwender, and C.E. Snyder Jr., A review of the effect of metals on the thermo-oxidative stability of perfluoropolyalkylether lubricants. Journal of Synthetic Lubrication, 2006. 23(4): p. 197-210.

Sims, Z.C., et al., High performance aluminum-cerium alloys for high-temperature applications. Materials Horizons, 2017. 4(6): p. 1070-1078.

Jahangirian, S., et al., A multi-physics 3D modeling methodology for multi-cylinder diesel engine thermal management and fatigue life prediction. SAE International Journal of Materials and Manufacturing, 2015. 8(3): p. 893-904.

Miles, P.C. The History and Evolution of Optically Accessible Research Engines and Their Impact on Our Understanding of Engine Combustion. in ASME 2014 Internal Combustion Engine Division Fall Technical Conference. 2014.

Fuhrmann, N., et al., Two-dimensional cycle-resolved exhaust valve temperature measurements in an optically accessible internal combustion engine using thermographic phosphors. Applied Physics B, 2012. 106(4): p. 945-951.

Yu, D., et al., Tracing Phase Transformation and Lattice Evolution in a TRIP Sheet Steel under High-Temperature Annealing by Real-Time In Situ Neutron Diffraction. Crystals, 2018. 8(9): p. 360.

Granroth, G.E., et al., Event-based processing of neutron scattering data at the Spallation Neutron Source. Journal of Applied Crystallography, 2018. 51(3): p. 616-629.

An, K., et al., First In Situ Lattice Strains Measurements Under Load at Vulcan. Metallurgical and Materials Transactions A, 2011. 42(1): p. 95-99.

Ikeda, T., et al., Residual Stress Analysis for Additive Manufactured Large Automobile Parts by Using Neutron and Simulation. 2020, SAE International.

Aman, A., et al., In-situ neutron diffraction of $LaCoO_3$ perovskite under uniaxial compression. I. Crystal structure analysis and texture development. Journal of Applied Physics, 2014. 116(1): p. 013503.

Pickett, L.M. and J.J. Lopez, Jet-wall interaction effects on diesel combustion and soot formation. 2005, SAE Technical Paper 2005-01-0921.

Wu, W., et al., PIND: High spatial resolution by pinhole neutron diffraction. Applied Physics Letters, 2018. 112(25).

An, K., et al., RHEGAL: Resistive heating gas enclosure loadframe for in situ neutron scattering. Review of Scientific Instruments, 2018. 89(9).

An, K., Y. Chen, and A.D. Stoica, Vulcan: A "hammer" for high-temperature materials research. Mrs Bulletin, 2019. 44(11): p. 878-883.

* cited by examiner

NEUTRONIC ENGINE

CROSS-REFERENCE TO RELATED APPLICATIONS

This application claims the benefit of U.S. Provisional Application 63/208,124, filed Jun. 8, 2021, which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to neutron diagnostics of an internal combustion engine.

BACKGROUND OF THE INVENTION

Internal combustion engines convert chemical energy stored in fuel into mechanical energy by the direct force on engine components applied from the expansion of high-temperature and high-pressure gases produced by combustion. Both the stationary components (e.g. cylinder head, liner, and manifolds) and the moving components (e.g. pistons and valves) undergo complex thermomechanical cycles at frequencies ranging from less than 1,000 rev/min at idle to nearly 20,000 rev/min in racing applications. Both spark-ignited (gasoline) and compression-ignited (diesel) engines undergo rapid release of chemical energy, producing extremely transient load states and thermal gradients inside the combustion chamber. This process presents many materials challenges, as work extraction is performed in a highly dynamic, reactive, and corrosive environment producing extreme absolutes and temporospatial gradients of temperature and pressure.

For example, it is common for internal combustion engines to operate at peak gas temperatures exceeding 2,200° C. and peak pressures ranging from 0.5-2.5 MPa with pressure rise rates of 10-50 MPa/ms, and during abnormal combustion events such as pre-ignition and detonation, pressure rise rates can exceed 100 MPa/ms. Heat fluxes through the various surfaces in the combustion chamber can vary dramatically at different locations due to inhomogeneity of the combustion gases and may locally exceed 10 MW/m$^2$ for periods of several ms when burning fuel jets impinge upon surfaces.

Development and adoption of new materials with improved mechanical and thermal integrity can increase reliability and can enable higher efficiency of internal combustion engines while also making space for elevated operational temperatures and the use of forced air induction technologies, further increasing efficiency gains. Additionally, if new materials are adopted with a higher specific strength, there is potential to improve transient load response times and fuel economy through light-weighting.

Understanding the dynamic behavior of temperature, stress, and strain during operation of an internal combustion engine is valuable in the development of new materials and for achieving improvements to efficiency, durability, and safety. However, due to the lack of a non-destructive evaluation tool that can emulate the real operating conditions inside an internal combustion engine, a true understanding of operando dynamic thermomechanical behaviors and responses of the engine components is limited. Purpose built "optical" research engines for this application employ windows in pistons, cylinder heads, and other parts of the engine to create beam paths. However, these windows limit such optical research engines to low absolute pressures and temperatures, and the optical research engines are usually operated in a skip-firing mode.

SUMMARY OF THE INVENTION

An internal combustion engine for neutron diffraction research is provided. The internal combustion engine includes a neutron-transparent combustion chamber to enable three-dimensional and time-resolved measurements of strain, stress, and temperature, as well as phase transformation, texture, and microstructure throughout the metal components of the internal combustion chamber. Fixturing and a cradle for neutron diffraction research is also provided.

In one embodiment, the internal combustion engine includes an elongated cylinder formed from an aluminum alloy to ensure maximum neutron visibility into the combustion chamber. An elongated piston assembly reciprocates within the elongated cylinder, the piston assembly including an upper piston, a lower piston, and an extension therebetween. The upper piston and the extension are hollow, thereby reducing the reciprocating mass and increasing neutron access to the combustion chamber. The upper piston is lubricated with a neutron-transparent fluorocarbon lubricant, while the lower piston and the crankcase are lubricated with a hydrocarbon lubricant. The fluorocarbon and hydrocarbon lubricants are isolated from each other via upper and lower seal packs that are axially spaced apart from each other along the extension. Each seal pack includes a pair of dynamic elastomer seals, and the location of the seal packs at spaced apart portions of the extension ensures that there is a buffer zone in the cylinder barrel which is swept by neither lubricant during piston travel. Extending the piston assembly also allows the distance between the cylinder head deck and the crankshaft to be increased for increased neutron access to the combustion chamber without changing the stroke or the compression ratio of the internal combustion engine.

The high transparency of aluminum to neutrons makes aluminum a favorable window material for neutron diagnostics, which allows the engine to be a true all-metal engine with the same load and boundary conditions of modern passenger car engines. During testing, the engine is horizontally supported by a cradle having lifting points so that it can be installed on a sample positioning stage using an overhead crane. The cylinder axis lies in a 45-degree plane relative to an incident neutron beam and relative to left and right detector banks. Radial receiving collimators are affixed to the left and right detector banks. Neutron diffraction of the engine provides the non-invasive measurement of lattice strains inside the combustion chamber, thereby enabling the study of complex load states and thermal gradients across a range of operating conditions.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

As discussed herein, the current embodiments include an internal combustion engine for neutron diffraction research, hereinafter referred to as a "neutronic engine." The neutronic engine includes a neutron-transparent combustion chamber to enable three-dimensional and time-resolved measurements of strain, stress, and temperature, as well as phase transformation, texture, and microstructure throughout the metal components of the combustion chamber.

Figure 1:
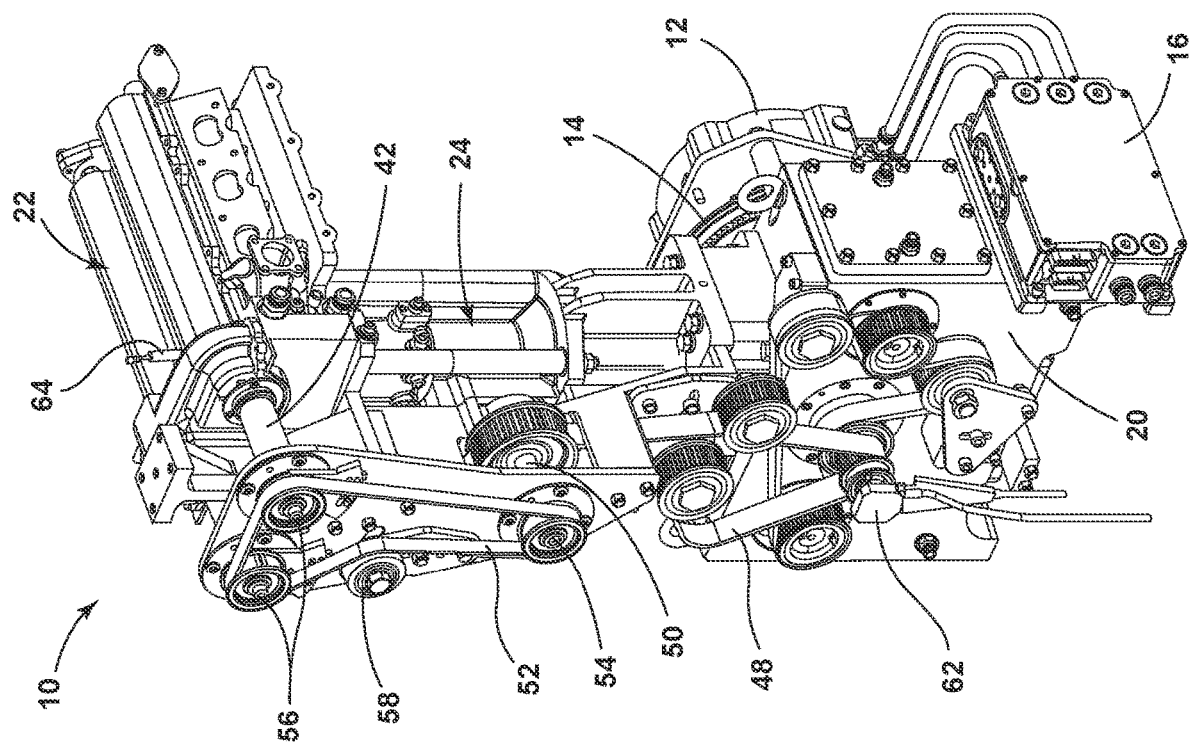
FIG. 1 is a perspective view of a neutronic engine in accordance with one embodiment of the invention.

Referring first to FIG. 1, a neutronic engine in accordance with one embodiment is illustrated and generally designated 10. The neutronic engine 10 in this embodiment is a single-cylinder, 0.5 L direct-injection engine with dual overhead cam shafts, however other engine configurations can be used in other embodiments. The neutronic engine 10 is coupled to a motoring dynamometer 12, for example an EVO AF125 axial flux motor. The dynamometer 12 is mounted to a flywheel 14 and is powered by an RMS PM100DX inverter 16 mounted on the crankcase 20. The DC connection from the inverter 16 to an external bi-directional power supply is achieved with a flexible cable, allowing the motor 12 and the inverter 16 to freely translate and rotate with the engine 10.

Figure 2:
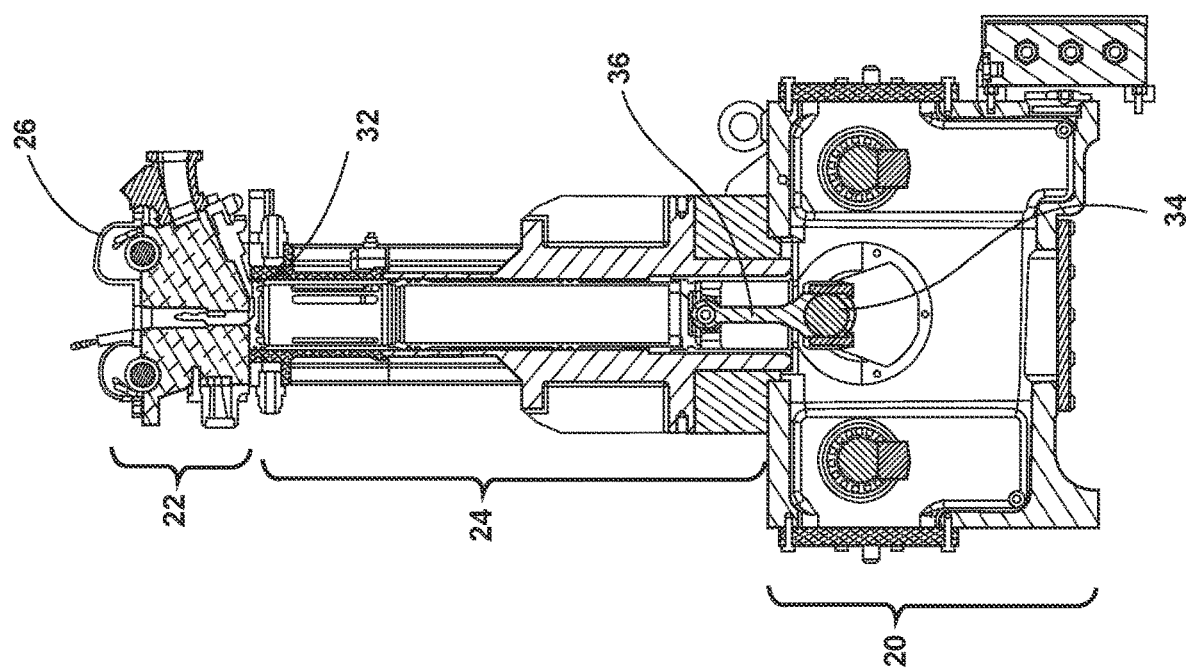
FIG. 2 is a first cross-sectional view of the neutronic engine of FIG. 1.
Figure 3:
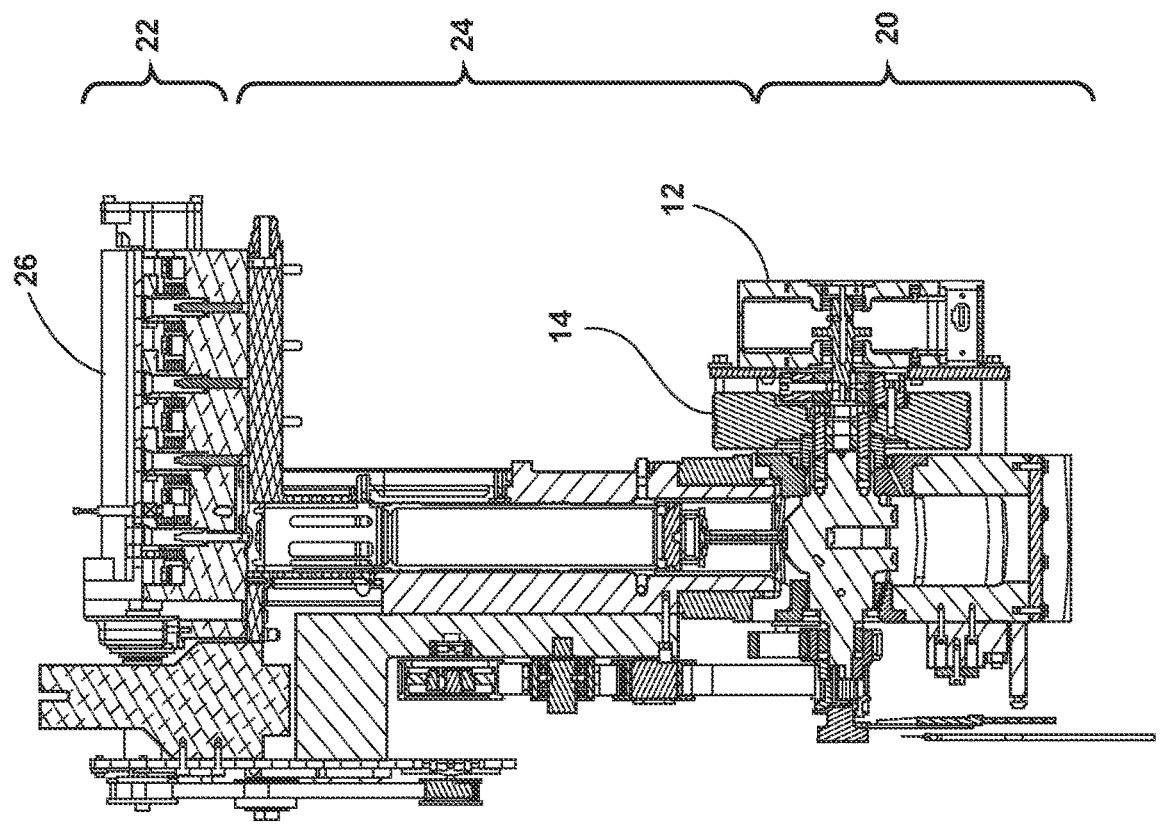
FIG. 3 is a second cross-sectional view of the neutronic engine of FIG. 1.
Figure 4:
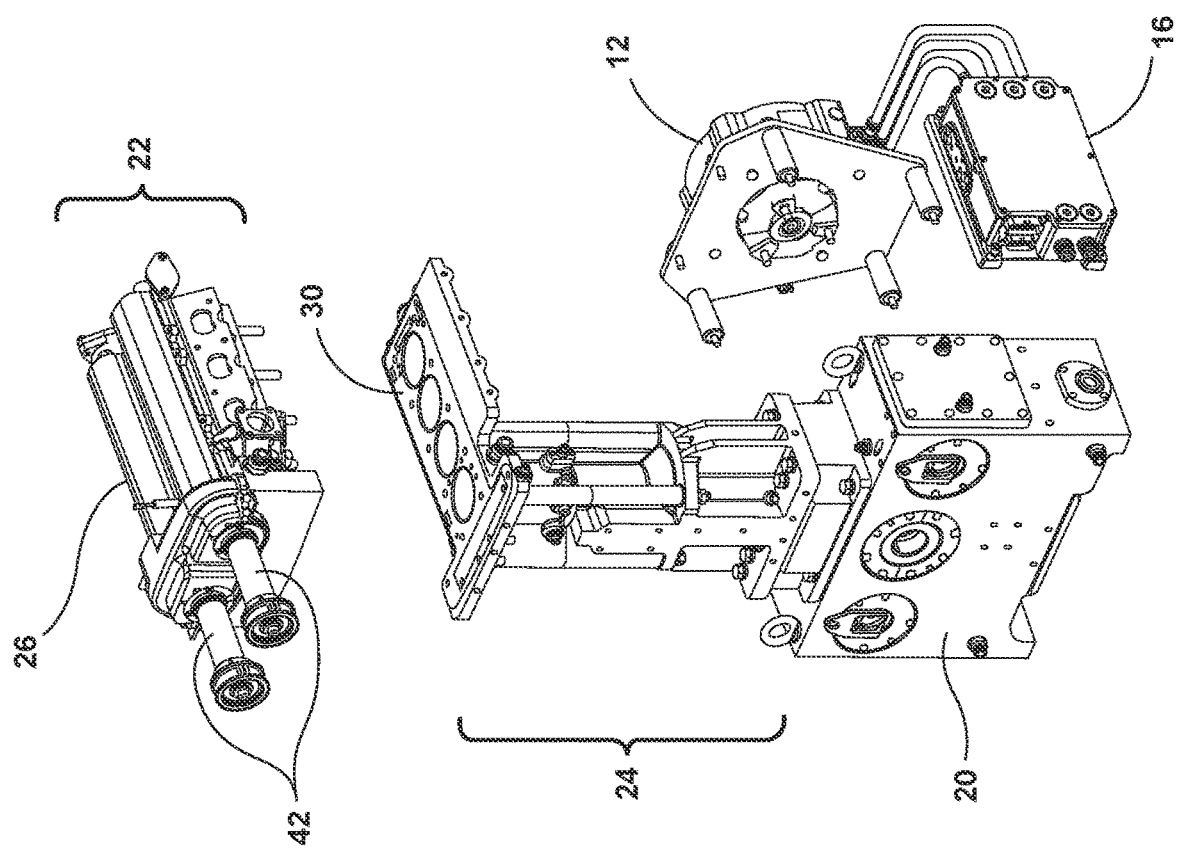
FIG. 4 is a first exploded view of the neutronic engine of FIG. 1.

As more specifically shown in FIGS. 2-4, the neutronic engine 10 includes a cylinder head 22 and an extended cylinder 24. The cylinder head 22 includes a cylinder head cover 26, first and second belt-driven camshafts 28, and a head gasket 30. Four cylinder openings are shown in FIG. 4, however only a single cylinder is used in the illustrated embodiment. The cylinder head 22 sits atop the cylinder 24, and the cylinder 24 guides the internal piston assembly within a cylinder bore. The combustion chamber 32 is located at the upper end of the cylinder bore, immediately below the cylinder head 22. The cylinder 24 is bolted to the crankcase 20, and the crankcase 20 contains the crankshaft 34 and the connecting rod 36. The crankshaft 34 is coupled to the external flywheel 14, which as noted above is coupled to the dynamometer 12.

Figure 5:
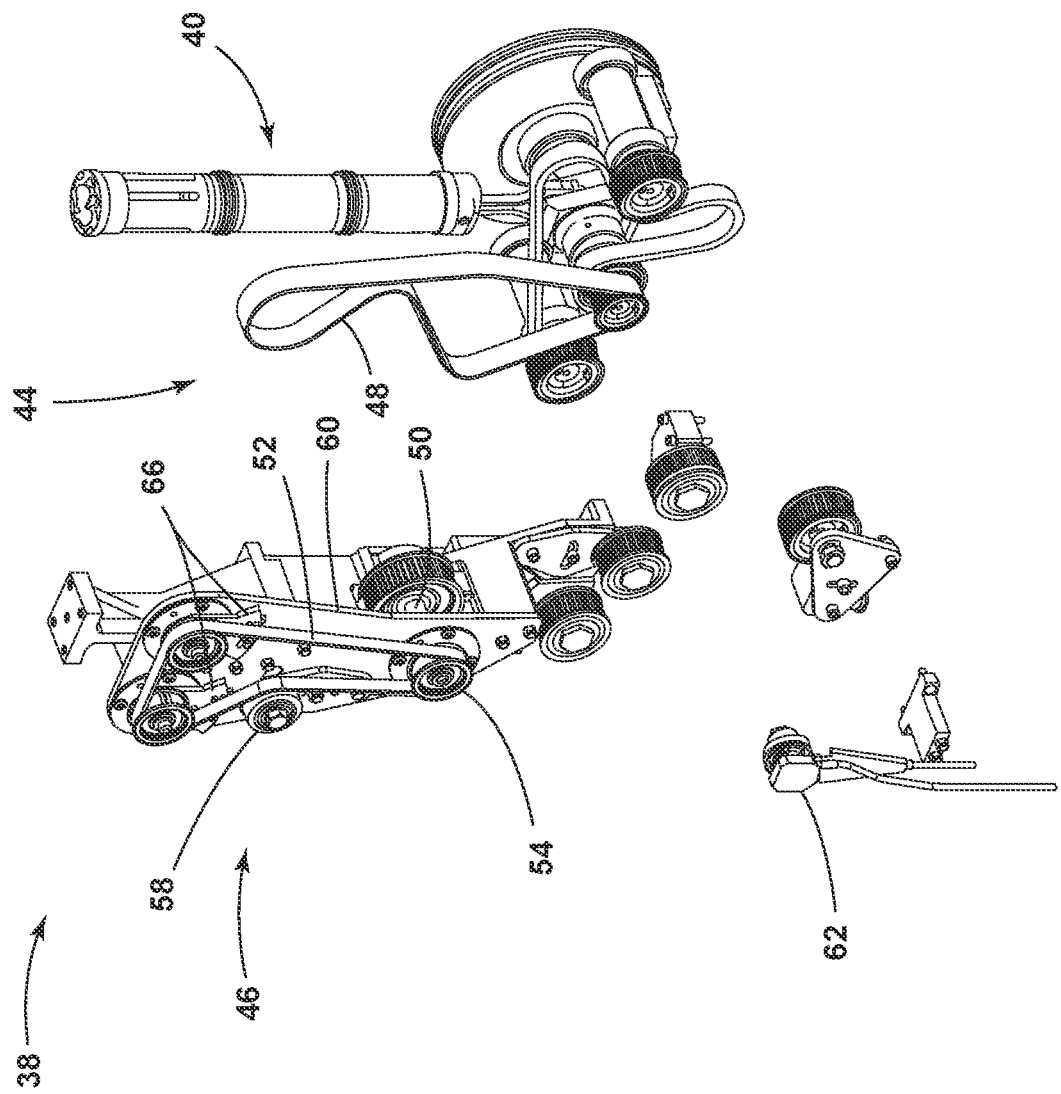
FIG. 5 is a second exploded view of the neutronic engine of FIG. 1.

The timing drive 38 and the extended piston assembly 40 are shown in greater detail in FIG. 5. The timing drive 38 is divided into lower and upper timing drives 44, 46, which lie on different planes, in order to improve neutron access to the combustion chamber 32. By using camshaft extensions 42, the upper timing drive 46 is pushed away from the cylinder head 22, reducing the angular range over which neutrons entering or exiting the combustion chamber 32 are shadowed. The lower timing drive 44 is driven by the crankshaft 34, and the lower timing belt 48 is routed to an intermediate timing drive shaft 50. The timing drive shaft 50 connects the lower and upper timing drives. The upper timing drive belt 52 is routed over a drive pulley 54 and two camshaft pulleys 56 using a single tensioner pulley 58. Collectively, the crankshaft 34, the lower timing drive 44, and the upper timing drive 46 comprise a crank train. A bearing plate 60 supports drive pulley 54. The lower timing belt 48 lies in a first pulley plane, and the upper timing belt 52 lies in a second pulley plane, which is offset from the first pulley plane. The engine 10 is fitted with an AVL 366C angle encoder 62 mounted on the front of the crankshaft 34. An in-cylinder pressure sensor 64 is also provided, for example a Kistler 6124A1S7-3 high speed sensor as shown in FIG. 1. Camshaft locking tools 66 are mounted on the bearing plate 60 to allow for phasing of the camshafts 28 to be adjusted relative to the phasing of the crankshaft 34.

Figure 6:
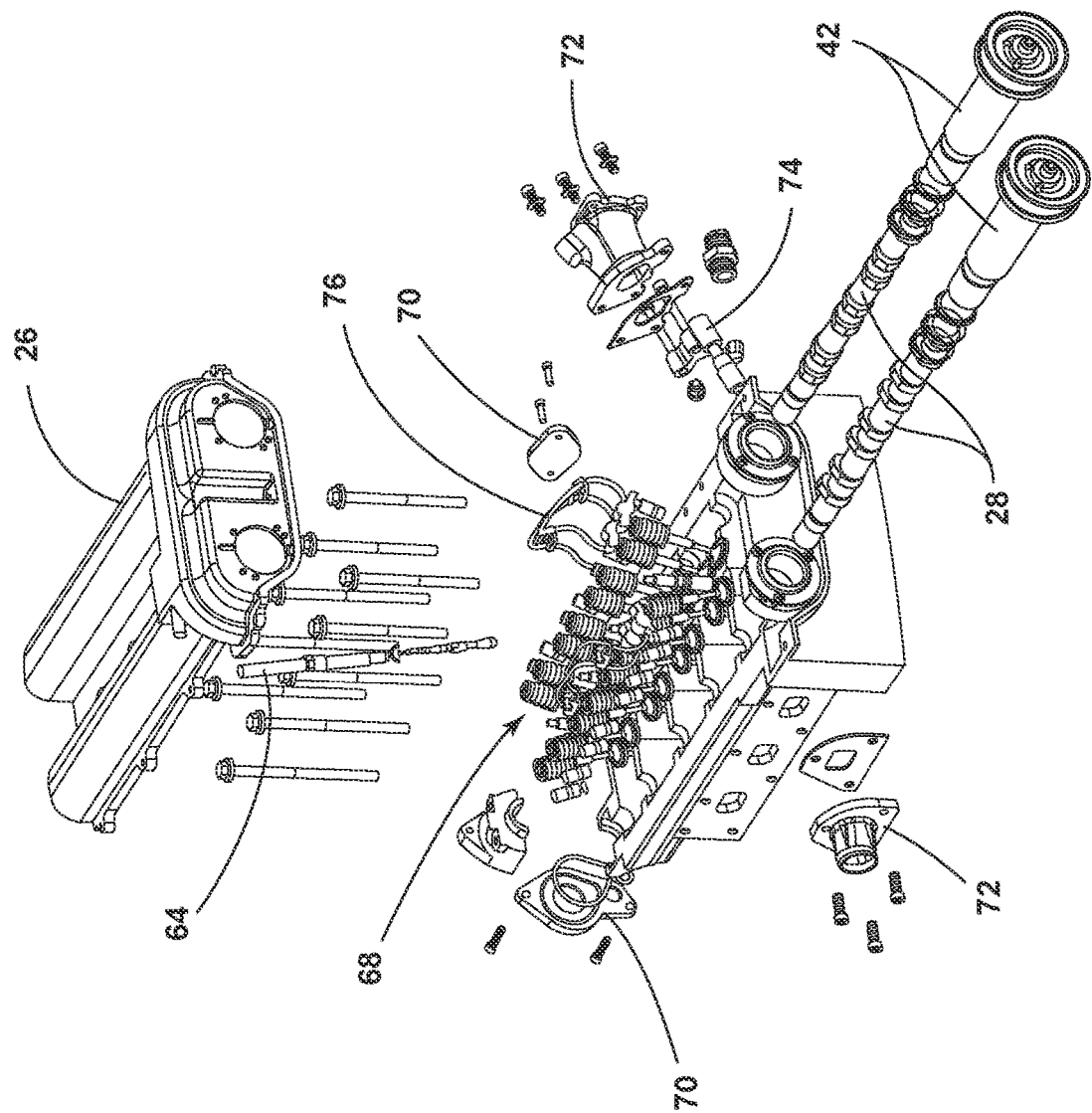
FIG. 6 is an exploded view of a cylinder head for a neutronic engine.

An exploded view of the cylinder head 22 and the valve train 68 is shown in FIG. 6. As with production engines, the valve train 68 controls the movement of air into the combustion chamber 32 and controls the discharge of combustion gases from the combustion chamber 32. The valve train 68 includes two inlet valves and two outlet valves per cylinder, but as noted above only one cylinder is used in the present embodiment. Fuel is delivered by an electronically actuated direct injector. Modifications from production engines include blanking plates 70 for unused features such as the vacuum pump and the high-pressure fuel pump, intake and exhaust port adaptors 72 for the single cylinder, a single cylinder fuel rail 74, a machined port in the cylinder head for the in-cylinder pressure transducer 68, extensions 42 for the intake and exhaust camshafts 28, and oil nozzles 76 which provide direct lubrication of the cam followers.

Figure 7:
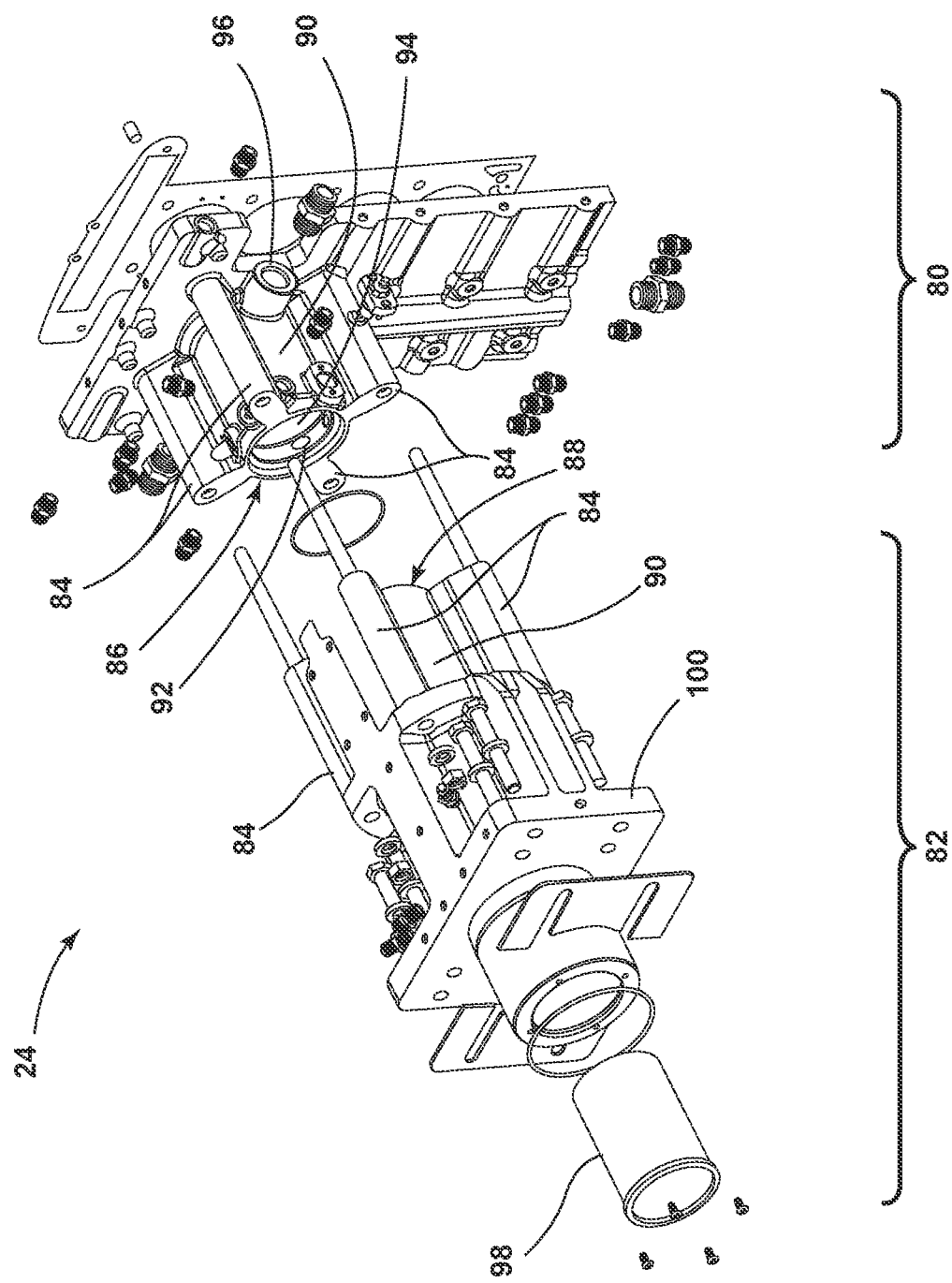
FIG. 7 is an exploded view of an elongated cylinder for a neutronic engine.

As noted above, the neutronic engine 10 includes an extended cylinder 24 for reciprocal movement of a piston assembly 40 therein. The extended cylinder 24 is illustrated in FIG. 7 and includes a head adaptor 80 and a barrel adaptor 82 that are secured together at four bolt locations. Structural integrity and bolt locations are provided by four axial ribs 84 that are spaced at 90-degree intervals about the exterior of the cylinder 24. The head adaptor 80 includes a first cylinder portion 86 and the barrel adaptor 84 includes a second cylinder portion 88. The first and second cylinder portions 86, 88 include opposing thin-walled sections 90 for improved neutron visibility. The first and second cylinder portions 86, 88 also include multiple oil scavenge ports 92 that are radially arranged to operate the engine 10 with the cylinder axis parallel to the ground and enable adequate oil scavenging when rotated about the cylinder axis.

In addition, the bore of the first cylinder portion 86 includes a cooling jacket 94 for heat rejection. The first cylinder portion 86 also includes an input port 96 through which piston cooling jet sprays with a fluorocarbon lubricant can be injected and an outlet port (not shown) for the continuous recovery and recirculation of fluorocarbon lubricant. The second cylinder portion 88 includes a removable liner 98 for the piston assembly 40, the removable liner 98 optionally being formed from cast iron. The barrel adaptor 82 includes a base plate 100 that is secured to the crankcase 20 via aligned bolt openings. The first and second cylinder portions 86, 88 are formed from aluminum, for example 6061-T6 aluminum, to ensure maximum neutron visibility in the combustion chamber. The second cylinder portion 88 also includes a port for a buffer gas (e.g., air, $N_2$, Ar, He), which maintains separation of the fluorocarbon and hydrocarbon lubricants.

Figure 8:
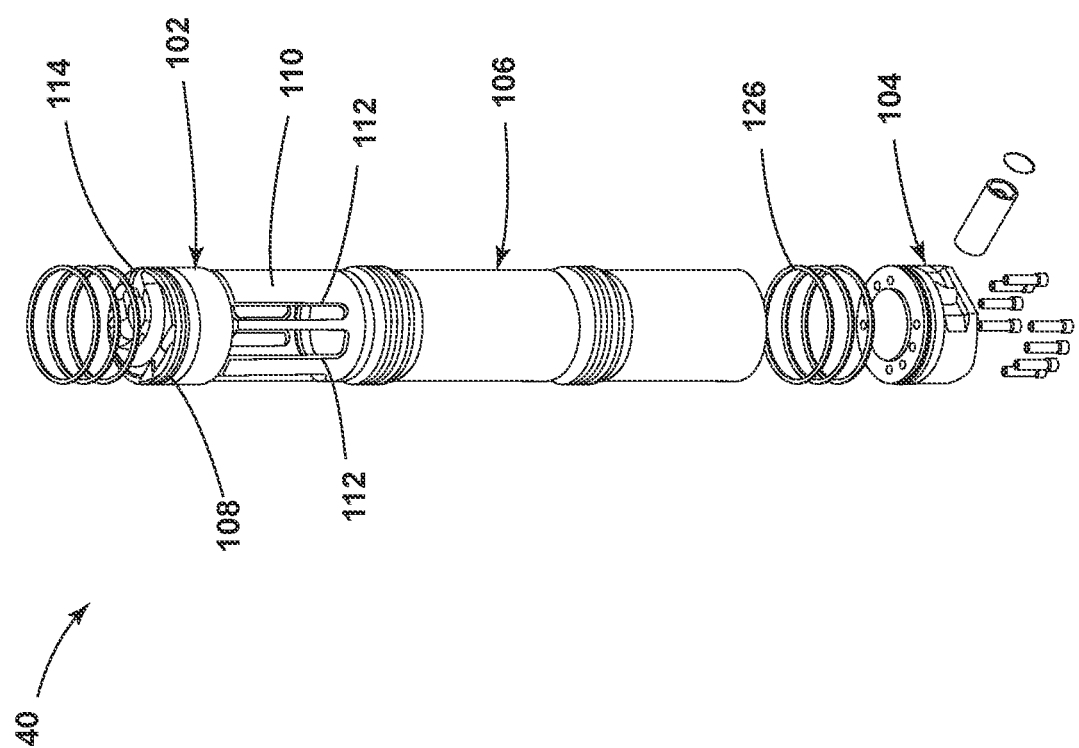
FIG. 8 is a first view of a piston assembly for a neutronic engine.
Figure 9:
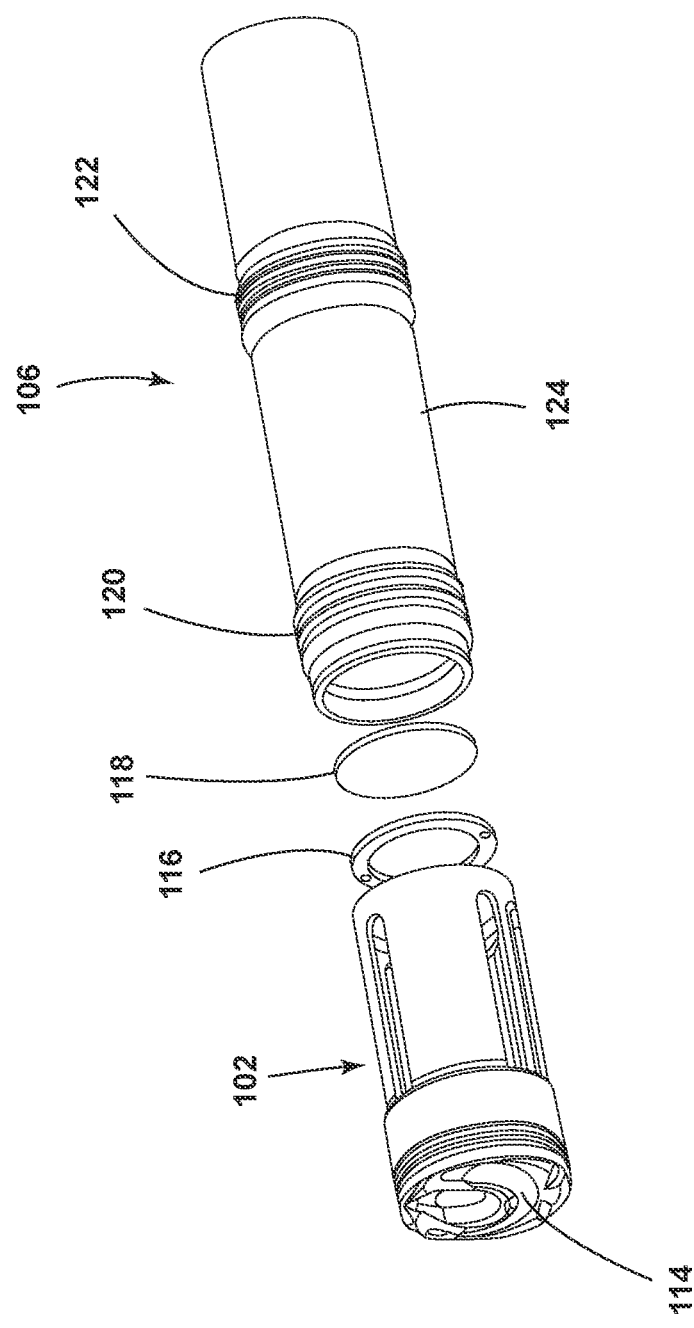
FIG. 9 is a second view of a piston assembly for a neutronic engine.
Figure 10:
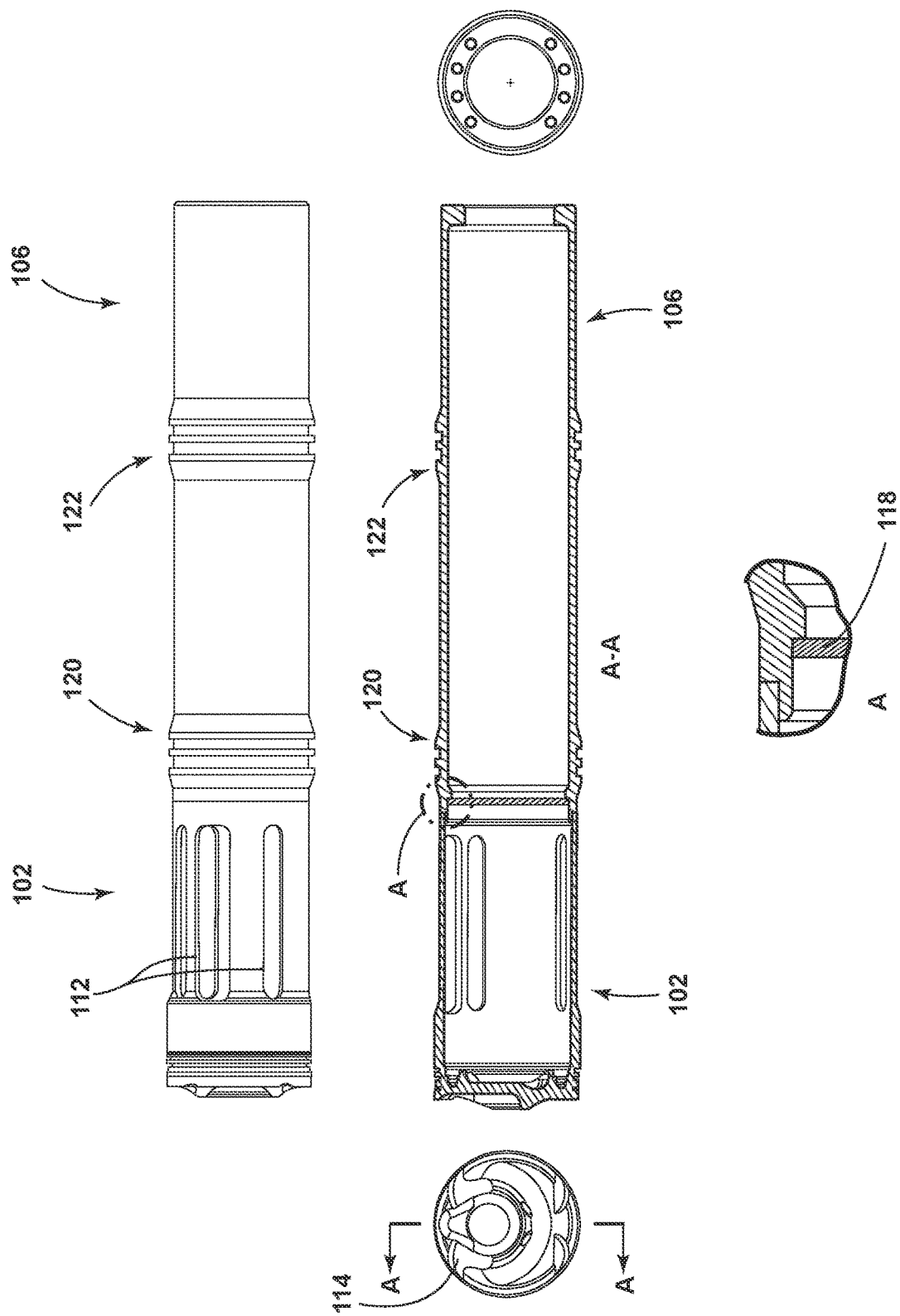
FIG. 10 illustrates side and cross-sectional views of a piston assembly.

The piston assembly 40 is shown in more detail in FIGS. 8-10 and includes an upper piston 102 and a lower piston 104 which are connected via an extension 106. The upper piston 102, the lower piston 104, and the extension 106 are formed from aluminum to be transparent to incident neutrons and scattered neutrons. Extending the piston assembly 40 allows the distance between the cylinder head 22 and the crankshaft 34 to be increased without changing the stroke or the compression ratio of the engine. By doing so, the incident neutron beam can enter the combustion chamber 32 from the underside of the piston without having to pass through the crank case 20.

More specifically, the upper piston 102 can be formed from 4032-T6 aluminum alloy and includes a production crown geometry, thereby achieving the same compression ratio and combustion chamber geometry as a production engine. The upper piston 102 also includes a plurality of ring grooves 108 and a cylindrical sidewall 110. The cylindrical sidewall 110 includes longitudinal slots 112 which allow oil into the oil gallery under the piston crown 114 and which allow for oil scavenging at a variety of engine orientations about the cylinder axis. The upper piston 102 includes an oil gallery cap 116 (visible in FIG. 9) to ensure that the fluorocarbon lubricant travels through the oil gallery, entering and exiting at predetermined locations.

The piston extension 106 includes a bulkhead 118, such that the fluorocarbon lubricant is blocked from traveling through the interior of the extension 106 to the crank case 20. The piston extension 106 can be formed from 6061-T6 aluminum and is hollow, thereby reducing the reciprocating mass and increasing neutron access to the combustion chamber 32. The piston extension 106 includes an upper set of sealing rings 120, which are disposed adjacent to the upper piston 102 to seal against the bore of the second cylinder portion 88 to ensure fluorocarbon lubricant from the upper piston 102 cannot travel to the lower piston 104. The piston extension 106 also includes a lower set of sealing rings 122, which are disposed adjacent to the lower piston 104 to seal against the bore of the second cylinder portion 88 to ensure hydrocarbon lubricant from the lower piston portion 104 cannot travel to the upper piston portion 102.

The extension 106 includes a cylindrical sidewall 124 with a reduced outer diameter relative to the outer diameter of the upper and lower sealing rings 120, 122 to accommodate the buffer gas introduced via the port in the second cylinder portion 88 to maintain the separation of fluorocarbon and hydrocarbon lubricants. The buffer gas is contained in an annular gap between the outer diameter of the extension 106 and the inner diameter of the cylinder bore.

The extension 106 is welded to the upper piston 102 and is fastened to the lower piston 104. The lower piston 104 can be made from 2618-T6 aluminum and can include lower piston rings 126 that ride against the removable cast iron liner 98. As noted above, the cylinder head 22 and the upper piston 102 are lubricated with a neutron-transparent fluorocarbon lubricant such as perfluoropolyether (PFPE). The crankcase 20 and the lower piston 104 are lubricated with hydrocarbon lubricant, for example 5W-30 motor oil. These lubricants are not miscible and are isolated from each other via the upper and lower seal packs 120, 122 that are axially spaced apart from each other along the length of piston assembly 40. Each seal pack includes a pair of dynamic elastomer seals, for example a FlexiSeal helical spring-loaded polyether ether ketone (PEEK)-filled polytetrafluoroethylene (PTFE) seal by Parker Hannifin Corp. The location of the seal packs 120, 122 ensures that there is a buffer zone in the cylinder 24 which is swept by neither of the lubricants during travel of the elongated piston assembly 40.

Figure 11:
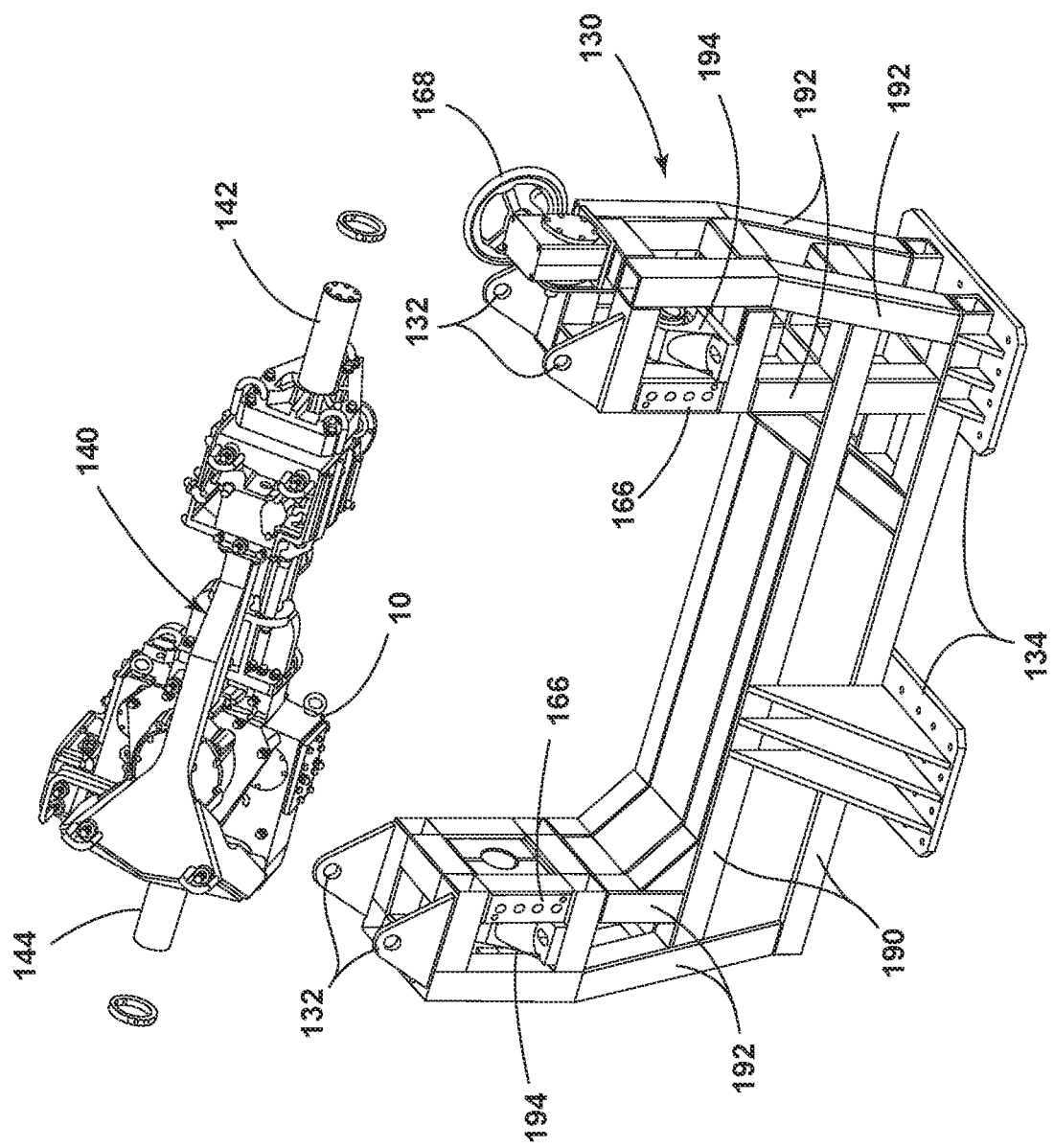
FIG. 11 is a perspective view of a neutronic engine and cradle.
Figure 12:
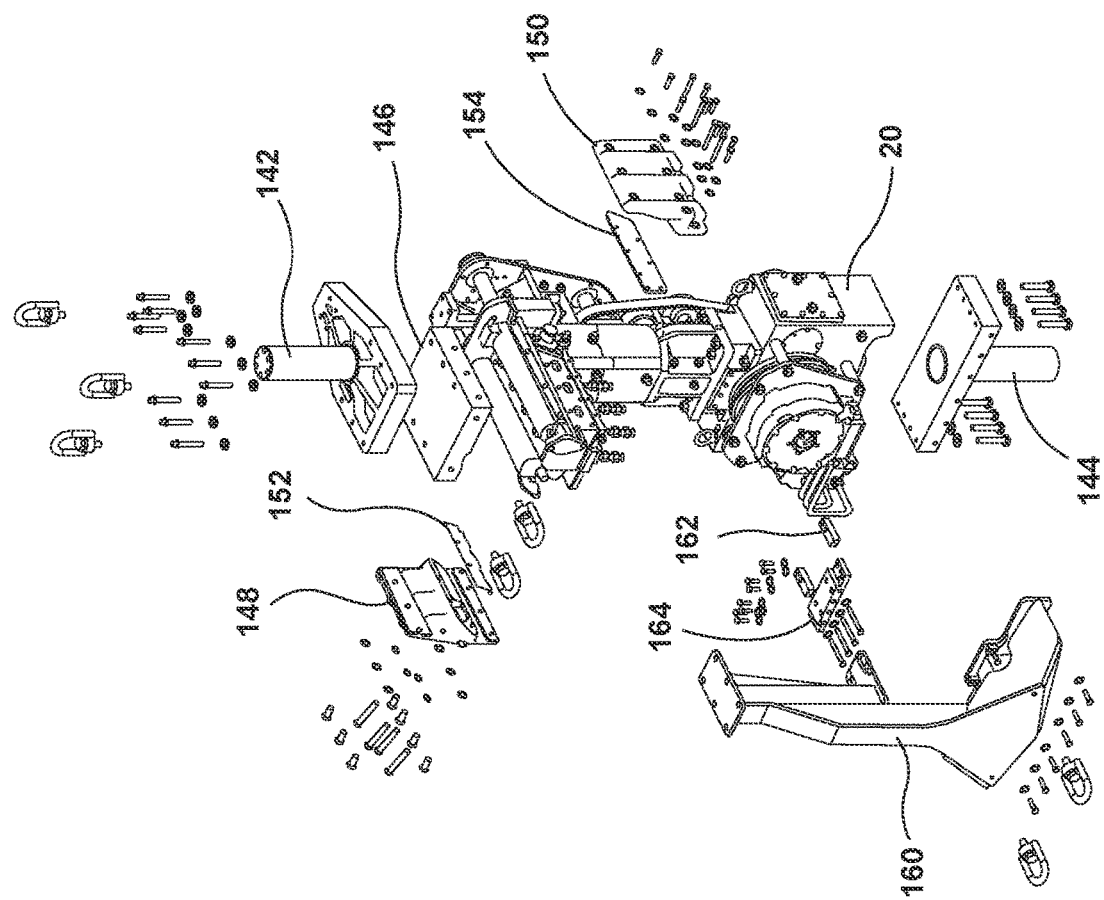
FIG. 12 is an exploded view of fixturing for a neutronic engine.

As shown in FIGS. 11-12, a support frame or cradle 130 includes lifting points 132 such that it can be installed in a diffractometer using an overhead crane. The cradle 130 also has outriggers 134 for direct mounting to a positioning stage. Fixturing 140 is provided for (a) supporting the engine 10 within the cradle 130 and (b) aligning the engine with the cradle 130 such that the piston 40 reciprocates co-linearly with a rotation axis, wherein the cradle 130 is configured to rotate the fixtured engine about the rotation axis. The fixturing 140 further includes a first spindle 142 to provide a first external mounting point adjacent the cylinder head 22 and a second spindle 144 to provide a second external mounting point adjacent the crank case 20.

Referring to FIG. 12, the fixturing 140 further includes a spindle block 146, a first spindle mount 148, and a second spindle mount 150. The first spindle mount 148 is connected to an intake manifold of the cylinder head 22, and the second spindle mount 150 is connected to an exhaust manifold of the cylinder head 22. An intake shim 152 aligns the first spindle mount 148, and an exhaust face shim 154 aligns the second spindle mount 150. Fasteners directly couple the second spindle 144 to the crank case 20.

As also shown in FIG. 12, the fixturing 140 includes an engine backbone 160, backbone mid-plate adaptor 162, and dynamometer mount plate 164. The engine backbone 160 couples with the first spindle 142 through the cylinder head 22 and couples directly to the second spindle 144 via multiple fasteners. The backbone mid-plate adaptor 162 is configured to couple the engine backbone 160 to the cylinder 24. The engine backbone 160 has a narrow profile in the azimuthal direction relative to the rotation axis and is elongated in the radial direction relative to the rotation axis, such that the engine backbone 160 will interfere with an incident neuron beam only in a narrow angular range.

Figure 13:
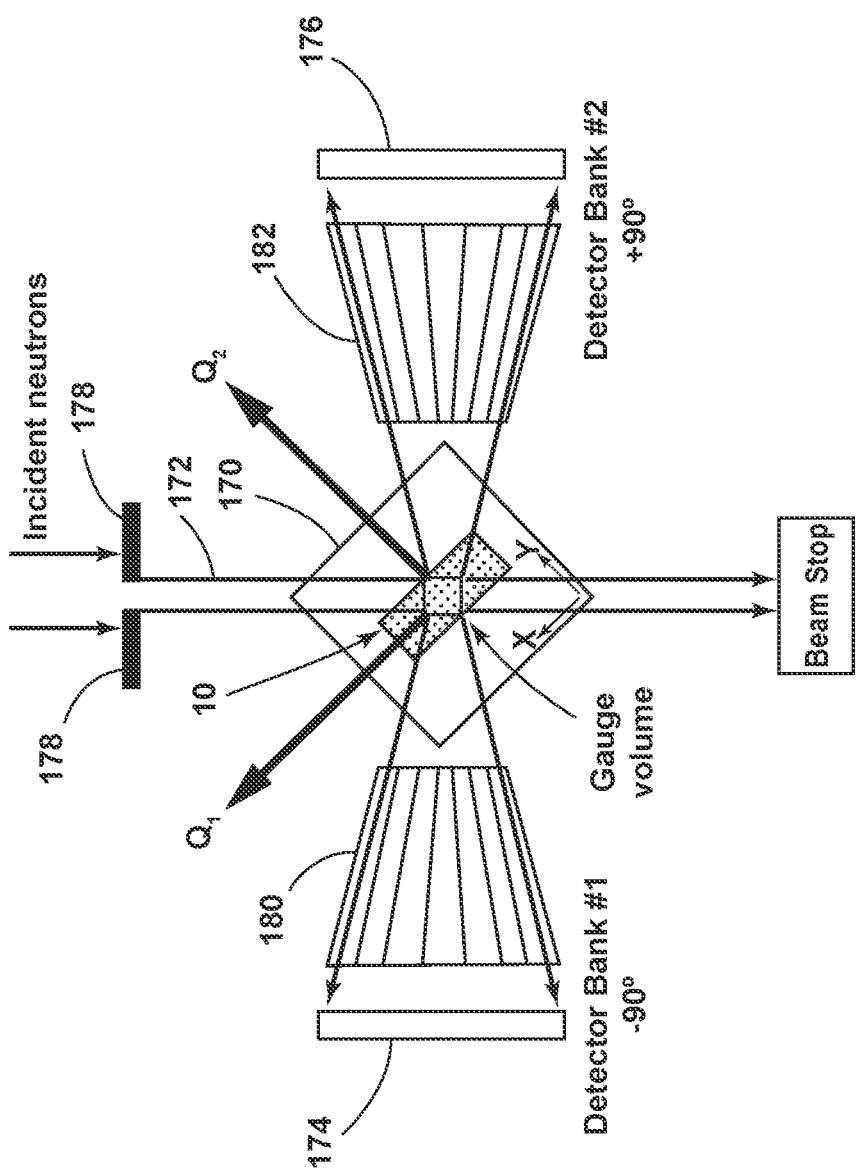
FIG. 13 illustrates neutron testing of a neutronic engine.

The engine 10 and the cradle 130 can be mounted directly to a sample positioning stage 170, shown in FIG. 13. In this orientation, the cylinder axis lies on a 45-degree plane relative to both of an incident beam 172 and first and second detector banks 174, 176. Each detector bank 174, 176 measures lattice spacing changes along the bisectors of the angles between the incident beam and the diffracted beam (±45°). The incident beam (as from the VULCAN neutron diffractometer at the Spallation Neutron Source at Oak Ridge National Laboratory) is collimated to 5×5 mm² by incident slits 178 ahead of the engine 10. Radial receiving collimators 180, 182 affixed to the detector banks 174, 176 located perpendicular to the incident beam 172 (±90°) restrict the location along the beam from which scattered neutrons may reach the detectors 174, 176. In this configuration, the cylinder axis aligns with a first scattering vector $Q_1$, which allows for a strain vector $\varepsilon_1$ to be in the direction of piston travel regardless of the current rotation of the engine 10 about the cylinder axis.

The cradle 130 includes a rotation mechanism 168 that is configured to rotate the engine 10 about the cylinder axis in conjunction with first and second spindles 142, 144, such that an arbitrary strain vector orthogonal to the cylinder axis can be aligned with the scattering vector of the other detector. In addition, the rotation mechanism 168 is configured to rotate the engine about the cylinder axis in conjunction with the first and second spindles 142, 144, such that the strain vectors in the radial direction relative to the cylinder axis are to be aligned with the second scattering vector $Q_2$. As also shown in FIGS. 11-12, the cradle includes a clamping mechanism 166 for clamping the first and second spindles 142, 144 such that the engine 10 cannot freely rotate during operation.

Lastly, the cradle 130 includes first beams 190, second beams 192, and bearings 194. The first beams 190 are oriented horizontally and are located below the fixtured engine 10. The second beams 192 are oriented vertically and are located beyond an axial extent of the fixtured engine 10, such that the first and second beams 190, 192 ensure that the fixtured engine rotates freely without interference from the cradle 130. The bearings 194 are supported by the second beams 192 and are configured to support the fixtured engine via the first and second spindles 142, 144. In addition, the first and second beams 190, 192 and the bearings 194 are positioned such that they are not within paths of an incident neutron beam nor scattered neutrons.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A reciprocating internal combustion engine to be coupled to a motoring dynamometer, the engine comprising:
   a cylinder head comprising a valve train;
   a cylinder coupled with the cylinder head, wherein the cylinder is axially elongated and comprises a first cylinder portion adjacent to the cylinder head and a second cylinder portion distal from the cylinder head, such that, during operation of the engine, the first cylinder portion is lubricated using a neutron-transparent fluorocarbon lubricant and the second cylinder portion is lubricated using a hydrocarbon lubricant;
   a piston disposed within the cylinder to form, along with the head and the first cylinder portion, a combustion chamber;
   a crankshaft operatively coupled with the piston and the motoring dynamometer; and
   a rotary encoder operatively coupled with the crankshaft and the valve train.

2. The engine of claim 1, wherein:
   the cylinder is coupled with the cylinder head through first fasteners,
   the first cylinder portion is coupled to the second cylinder portion through second fasteners, and
   the first cylinder portion and the second cylinder portion both have walls with a predetermined thickness, the walls comprising ribs running axially and protruding radially by a predetermined height larger than the predetermined thickness, the ribs being configured such that both the first and second fasteners run inside the ribs.

3. The engine of claim 1, wherein each of the first cylinder portion and the second cylinder portion comprise Aluminum to be transparent to incident and scattered neutrons.

4. The engine of claim 1, wherein the first cylinder portion has no liner so the first cylinder portion is transparent to incident and scattered neutrons.

5. The engine of claim 1, wherein a bore of the first cylinder portion has coating for friction and wear reduction.

6. The engine of claim 1, wherein the first cylinder portion comprises an input port through which a piston cooling jet sprays the fluorocarbon lubricant on the side of the piston opposite to the side defining the combustion chamber.

7. The engine of claim 1, wherein the first cylinder portion and the second cylinder portion comprise multiple oil scavenge ports radially arranged to:
   operate the engine with the cylinder axis parallel to the ground, and
   enable adequate oil scavenging when rotated about the cylinder axis.

8. The engine of claim 1, wherein the first cylinder portion comprises an interior cooling jacket which surrounds the combustion chamber with the fluorocarbon coolant.

9. The engine of claim 8, wherein the first cylinder portion comprises external ports configured to enable inlet and outlet connections of the interior cooling jacket to an external source of the fluorocarbon coolant.

10. The engine of claim 1, wherein the first cylinder portion comprises ports configured to send the fluorocarbon coolant in and out of the cylinder head.

11. The engine of claim 1, wherein the second cylinder portion comprises a removable liner configured as a bearing surface against reciprocating motion of the piston to minimize radial loading in the bore of the first cylinder portion.

12. The engine of claim 1, wherein the second cylinder portion comprises a port for a buffer gas (e.g., air, $N_2$, Ar, He) which maintains separation of the fluorocarbon and hydrocarbon lubricants.

13. The engine of claim 1, wherein each of the first piston portion, the second piston portion, and the third piston portion comprises Aluminum to be transparent to incident and scattered neutrons.

14. A reciprocating internal combustion engine to be coupled to a motoring dynamometer, the engine comprising:
a cylinder head comprising a valve train;
a cylinder coupled with the cylinder head, wherein the cylinder is axially elongated and comprises a first cylinder portion adjacent to the cylinder head and a second cylinder portion distal from the cylinder head, such that, during operation of the engine, the first cylinder portion is lubricated using a fluorocarbon lubricant and the second cylinder portion is lubricated using a hydrocarbon lubricant;
a piston disposed within the cylinder to form, along with the head and the first cylinder portion, a combustion chamber;
a crankshaft operatively coupled with the piston and the motoring dynamometer; and
a rotary encoder operatively coupled with the crankshaft and the valve train,
wherein the piston comprises a first piston portion, a second piston portion, and a third piston portion, the second piston portion being sandwiched between the first and third piston portions, wherein the first piston portion comprises:
ring grooves, and
an annular wall which extends from the ring grooves to the second piston portion, such that neither a wrist pin nor a piston rod is used to allow neutron transparency.

15. The engine of claim 14, wherein the first piston portion has an axial cutout in the annular wall to accommodate a piston cooling jet which targets an oil gallery on the side of the first piston portion opposite to the side defining the combustion chamber.

16. The engine of claim 14, wherein the first piston portion has axial cutouts in the annular wall to accommodate scavenging of the fluorocarbon lubricant from an oil gallery.

17. The engine of claim 1, wherein the first piston portion comprises an oil gallery cap to ensure that the fluorocarbon lubricant travels through an oil gallery, entering and exiting at predetermined locations.

18. The engine of claim 1, wherein the first piston portion and the second piston portion form a contiguous joint.

19. The engine of claim 1, wherein the second piston portion comprises a bulkhead at a joint with the first piston portion, such that the fluorocarbon lubricant from the first piston portion is blocked from travelling through the interior of the second piston portion to a crank case or the third piston portion.

20. A reciprocating internal combustion engine to be coupled to a motoring dynamometer, the engine comprising:
a cylinder head comprising a valve train;
a cylinder coupled with the cylinder head, wherein the cylinder is axially elongated and comprises a first cylinder portion adjacent to the cylinder head and a second cylinder portion distal from the cylinder head, such that, during operation of the engine, the first cylinder portion is lubricated using a fluorocarbon lubricant and the second cylinder portion is lubricated using a hydrocarbon lubricant;
a piston disposed within the cylinder to form, along with the head and the first cylinder portion, a combustion chamber;
a crankshaft operatively coupled with the piston and the motoring dynamometer; and
a rotary encoder operatively coupled with the crankshaft and the valve train,
wherein the piston comprises a first piston portion, a second piston portion, and a third piston portion, the second piston portion being sandwiched between the first and third piston portions, wherein the second piston portion comprises first sealing rings which are disposed adjacent to the first piston portion to seal against bore of the second cylinder portion to ensure that fluorocarbon lubricant from the first piston portion cannot travel to the third piston portion.

21. The engine of claim 20, wherein the second piston portion comprises second sealing rings, which are disposed adjacent to the third piston portion to seal against bore of the second cylinder portion to ensure that hydrocarbon lubricant from the third piston portion cannot travel to the first piston portion.

22. The engine of claim 21, wherein the second piston portion comprises a portion between the first sealing rings and the second sealing rings with a smaller radius than radiuses of the first and second sealing rings to accommodate the buffer gas introduced via the port in the second cylinder portion to maintain separation of fluorocarbon and hydrocarbon lubricants.

23. The engine of claim 1, wherein the second piston portion is connected to the third piston portion with third fasteners.

24. The engine of claim 23, wherein the third piston portion comprises mounting holes through which the third fasteners connect with the second piston portion.

25. The engine of claim 23, wherein the third piston portion comprises a machined surface to mate with the second piston portion.

26. The engine of claim 1, wherein the cylinder head comprises camshafts, and wherein the engine further comprises a crank train comprising the crankshaft, a first timing drive portion connected to the camshafts, the first timing drive portion comprising first pulleys, and a second timing drive portion connected to the crankshaft, the second timing drive portion comprising second pulleys.

27. The engine of claim 26, wherein:
the cylinder head comprises camshaft extensions to offset the first timing drive portion from the cylinder head and the cylinder to minimize attenuation of incident and scattered neutrons targeting the combustion chamber,
the first pulleys lie within a first pulley plane, and
the second pulleys lie within a second pulley plane offset from the first pulley plane.

28. The engine of claim 27, comprising a shaft configured to travel perpendicularly between the first and second pulley planes, the shaft being further configured to connect the first pulleys with the second pulleys.

29. The engine of claim 28, comprising a bearing plate configured to support the first pulleys and the shaft and configured to define the first pulley plane.

30. The engine of claim 29, comprising camshaft locking tools mounted on the bearing plate and configured to allow for phasing of the camshafts to be adjusted relative to the phasing of the crankshaft.

31. A system comprising:
a reciprocating internal combustion engine, the engine including:
a cylinder head comprising a valve train,
a cylinder coupled with the cylinder head, wherein the cylinder is axially elongated and comprises a first cylinder portion adjacent to the cylinder head and a second cylinder portion distal from the cylinder head, such that, during operation of the engine, the first cylinder portion is lubricated using a fluorocarbon lubricant and the second cylinder portion is lubricated using a hydrocarbon lubricant,
a piston disposed within the cylinder to form, along with the head and the first cylinder portion, a combustion chamber,
a crankshaft operatively coupled with the piston and a motoring dynamometer, and
a rotary encoder operatively coupled with the crankshaft and the valve train;
a cradle defining a rotation axis within a plane parallel to the ground; and
fixturing configured to:
mount the engine within the cradle, and
align the engine within the cradle such that the piston is to reciprocate co-linearly with a rotation axis, wherein the cradle is configured to rotate the fixtured engine about the rotation axis,
wherein the cradle is transversely sized and configured to fit, with the engine installed, along a 45° plane between neutron collimators and slits of an incident neutron beam, such that the cylinder's axis is aligned with a first scattering vector $Q_1$, allowing for strain vector ci to be in the direction of piston travel regardless of the current rotation of the engine about the cylinder axis.

32. The system of claim 31, wherein the fixturing comprises:
a first spindle configured to provide a first external mounting point adjacent to the cylinder head, and
a second spindle configured to provide a second external mounting point adjacent to the crank case.

33. The system of claim 32, wherein the fixturing comprises:
a spindle block configured to support the engine through the first spindle,
a first spindle mount connected to an intake manifold of the cylinder head, and
a second spindle mount connected to exhaust manifold of the cylinder head, the first and second spindle mounts being configured to couple the spindle block to the cylinder head.

34. The system of claim 33, wherein the fixturing comprises:
an intake face shim configured to align the first spindle mount, and
an exhaust face shim configured to align the second spindle mount.

35. The system of claim 32, wherein the fixture comprises fourth fasteners configured to couple the second spindle directly to the crank case.

36. The system of claim 31, wherein the fixturing comprises:
an engine backbone configured to:
couple with the first spindle through the cylinder head, and
couple directly to the second spindle with fifth fasteners.

37. The system of claim 36, wherein the fixturing further comprises:
a backbone mid-plate adaptor configured to couple the engine backbone to the cylinder.

38. The system of claim 36, wherein the fixturing further comprises:
a dynamometer mount plate bracket configured to couple the engine backbone to the dynamometer.

39. The system of claim 36, wherein the engine backbone has a narrow profile in the azimuthal direction relative to the rotation axis and it is elongated in the radial direction relative to the rotation axis such that the engine backbone will interfere with an incident neutron beam only in a narrow angular range.

40. The system of claim 31, wherein each of the first spindle mount and the second spindle mount comprises Aluminum to be transparent to incident and scattered neutrons.

41. The system of claim 31, wherein the fixturing further comprises:
lifting eyes located on the first spindle, the spindle block, and the engine backbone, the lifting eyes being configured to enable:
lifting the fixtured engine with the cylinder axis parallel to gravity and the cylinder head on top, and
repositioning the fixtured engine with the cylinder's axis orthogonal to gravity for installation into the cradle.

42. The system of claim 31, wherein the cradle comprises a rotation mechanism configured to rotate the engine about the cylinder axis in conjunction with the first and second spindles, such that an arbitrary strain vector orthogonal to the cylinder axis can be aligned with the scattering vector of the other detector.

43. The system of claim 42, wherein the rotation mechanism is configured to rotate the engine about the cylinder axis in conjunction with the first and second spindles, such that the strain vectors in the radial direction relative to the cylinder axis are to be aligned with the second scattering vector $Q_2$.

44. The system of claim 31, wherein the cradle comprises a clamping mechanism for clamping the first and second spindles such that the engine cannot freely rotate during operation.

45. The system of claim 31, wherein the cradle comprises mounting pads which allow direct mating to a sample positioning stage.

46. The system of claim 31, wherein the cradle comprises lifting points which allow for installation within a diffractometer by an overhead crane.

47. The system of claim 31, wherein the cradle comprises:
first beams oriented horizontally and located below the fixtured engine,
second beams oriented vertically and located beyond an axial extent of the fixtured engine, such that together the first and second beams ensure that the fixtured engine rotates freely without interference from the cradle, and
bearings supported by the second beams and configured to support the fixtured engine via the first and second spindles,
wherein the first and second beams and the bearings are positioned such that they are not within paths of an incident neutron beam nor scattered neutrons.

* * * * *